US012754208B2

(12) United States Patent
Lee

(10) Patent No.: US 12,754,208 B2
(45) Date of Patent: Oct. 6, 2026

(54) METHOD OF REMOVING AND COLLECTING PARTICLES FROM PHOTOMASK AND DEVICE FOR REMOVING AND COLLECTING PARTICLES THEREFROM

(71) Applicant: Samsung Electronics Co., Ltd., Suwon-si (KR)

(72) Inventor: Gyubaek Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 430 days.

(21) Appl. No.: 18/223,775

(22) Filed: Jul. 19, 2023

(65) Prior Publication Data

US 2024/0133919 A1 Apr. 25, 2024
US 2024/0230712 A9 Jul. 11, 2024

(30) Foreign Application Priority Data

Oct. 21, 2022 (KR) ........................ 10-2022-0136692
Dec. 28, 2022 (KR) ........................ 10-2022-0187758

(51) Int. Cl.
*G01Q 80/00* (2010.01)
*B08B 6/00* (2006.01)
(Continued)

(52) U.S. Cl.
CPC ............. *G01Q 80/00* (2013.01); *G01Q 60/24* (2013.01)

(58) Field of Classification Search
CPC ........ G01Q 80/00; G01Q 60/24; G01Q 60/40; G01Q 10/06; B08B 7/0028; B08B 6/00; G03F 1/82; G03F 1/84; G01N 1/22
See application file for complete search history.

(56) References Cited

U.S. PATENT DOCUMENTS 5,634,230 A * 6/1997 Maurer ..................... G03F 1/82 15/312.1
7,495,240 B2 2/2009 Hopkins et al.
(Continued)

FOREIGN PATENT DOCUMENTS

JP 2005084582 A * 3/2005
JP 2016071092 A * 5/2016
KR 1020050055465 A 6/2005

OTHER PUBLICATIONS

English Translation of JP2016071092A (Year: 2016).*
JP2005084582A (Year: 2005).*

*Primary Examiner* — David E Smith
*Assistant Examiner* — Laura Eloise Tandy
(74) *Attorney, Agent, or Firm* — Muir Patent Law, PLLC

(57) ABSTRACT

The inventive concept provides a method of removing and collecting particles from a photomask including fabricating the photomask on a substrate, generating a first map indicating locations of particles on a surface of the photomask by inspecting the surface of the photomask using a probe tip, vertically moving the probe tip to a first vertical height that is lower than a height of the particle, horizontally moving the probe tip parallel to the surface of the photomask at the first vertical height, generating a second map indicating locations of particles on the surface of the photomask using the probe tip, vertically moving the probe tip to a second vertical height that is lower than the first vertical height, and horizontally moving the probe tip parallel to the surface of the photomask at the second vertical height.

17 Claims, 12 Drawing Sheets

(51) Int. Cl.

| | |
|---|---|
| ***B08B 7/00*** | (2006.01) |
| ***G01N 1/22*** | (2006.01) |
| ***G01Q 10/06*** | (2010.01) |
| ***G01Q 60/24*** | (2010.01) |
| ***G01Q 60/40*** | (2010.01) |
| ***G03F 1/82*** | (2012.01) |
| ***G03F 1/84*** | (2012.01) |

(56) References Cited

U.S. PATENT DOCUMENTS

| | | | | |
|---|---|---|---|---|
| 11,262,378 | B2 | 3/2022 | Baur et al. | |
| 11,429,020 | B2 | 8/2022 | Baur et al. | |
| 2006/0225164 | A1* | 10/2006 | Williams ............... | G01Q 60/04 977/852 |
| 2008/0129950 | A1 | 6/2008 | Abe | |
| 2013/0037053 | A1 | 2/2013 | Robinson et al. | |

* cited by examiner

METHOD OF REMOVING AND COLLECTING PARTICLES FROM PHOTOMASK AND DEVICE FOR REMOVING AND COLLECTING PARTICLES THEREFROM

CROSS-REFERENCE TO RELATED APPLICATION

This application is based on and claims priority under 35 U.S.C. § 119 to Korean Patent Application Nos. 10-2022-0136692, filed on Oct. 21, 2022, and 10-2022-0187758 filed on December 28, in the Korean Intellectual Property Office, the disclosures of which are incorporated by reference herein in their entireties.

BACKGROUND

The inventive concept relates to a method of removing and collecting particles from a photomask and a device for removing and collecting particles therefrom.

Recently, with the high integration of semiconductor devices, the size of patterns formed on wafers has become finer, and a photolithography process using a photomask is used to form such fine patterns. According to the photolithography process, a photoresist film is coated on a material film on which a pattern is to be formed, and a portion of the photoresist film is scanned with light using a photomask. Then, a photoresist film pattern in which a part of the photoresist film is removed is formed by development using a developing solution. Subsequently, a material film pattern corresponding to the pattern on the photomask may be formed by removing an exposed portion of the material film through an etching process using the photoresist film pattern as an etch mask. However, in performing such a photolithography process, when there are particles in the photomask, the particles are transferred to the photoresist film such that a photoresist film pattern having a desired profile may not be formed. Therefore, after fabricating the photomask, it is desirable that particles that may be present on the photomask are removed. In addition, there is a need to collect particles in order to identify the components of the particles and lower the generation rate of the particles.

SUMMARY

The inventive concept provides a method of removing and collecting particles and a device for removing and collecting particles, capable of directly removing and collecting particles on a photomask.

In addition, the present inventive concept provided is not limited to the above-mentioned inventive concept, and other inventive concepts may be clearly understood by those skilled in the art from the description below.

According to an aspect of the inventive concept, there is provided a method of removing and collecting a plurality of particles from a photomask including fabricating the photomask on a substrate, generating a first map indicating locations of the plurality of particles on a surface of the photomask by inspecting the surface of the photomask using a probe tip, vertically moving the probe tip to a first vertical height that is lower than a height of a first particle among the plurality of particles, horizontally moving the probe tip parallel to the surface of the photomask at the first vertical height, generating a second map indicating locations of the plurality of particles on the surface of the photomask using the probe tip, vertically moving the probe tip to a second vertical height that is lower than the first vertical height, and horizontally moving the probe tip parallel to the surface of the photomask at the second vertical height.

According to an aspect of the inventive concept, there is provided a method of removing and collecting a plurality of particles from a photomask including fabricating the photomask on a substrate, generating a first map indicating locations of the plurality of particles on a surface of the photomask by inspecting the surface of the photomask using a probe tip, applying a first voltage to the probe tip and vertically moving the probe tip to a first vertical height that is lower than a height of a first particle among the plurality of particles based on the first map, horizontally moving the probe tip parallel to the surface of the photomask at the first vertical height, generating a second map indicating locations of the plurality of particles on the surface of the photomask using the probe tip, applying a second voltage that is higher than the first voltage to the probe tip and vertically moving the probe tip to a second vertical height that is lower than the first vertical height, and horizontally moving the probe tip parallel to the surface of the photomask at the second vertical height, wherein each of the horizontal moving of the probe tip at the first vertical height and the horizontal moving of the probe tip at the second vertical height includes horizontally moving the probe tip in a first direction toward the first particle, contacting the probe tip with the first particle, horizontally moving the probe tip in a second direction opposite to the first direction after moving the probe tip past the first particle, and contacting the probe tip with the first particle again.

According to an aspect of the inventive concept, there is provided a probe head including an actuator and configured to move the probe, a probe including a probe tip and configured to scan the surface of the photomask, a laser configured to irradiate a laser beam to the probe tip, a photodiode configured to receive the laser beam reflected from the probe tip of the probe, a controller circuit configured to receive data from the photodiode and generate a map of the surface of the photomask, wherein the probe tip includes a conductive layer formed on a surface of the probe tip, and the conductive layer is charged with a negative bias voltage or a positive bias voltage.

BRIEF DESCRIPTION OF THE DRAWINGS

Embodiments of the inventive concept will be more clearly understood from the following detailed description taken in conjunction with the accompanying drawings in which.

DETAILED DESCRIPTION OF THE EMBODIMENTS

Figure 1:
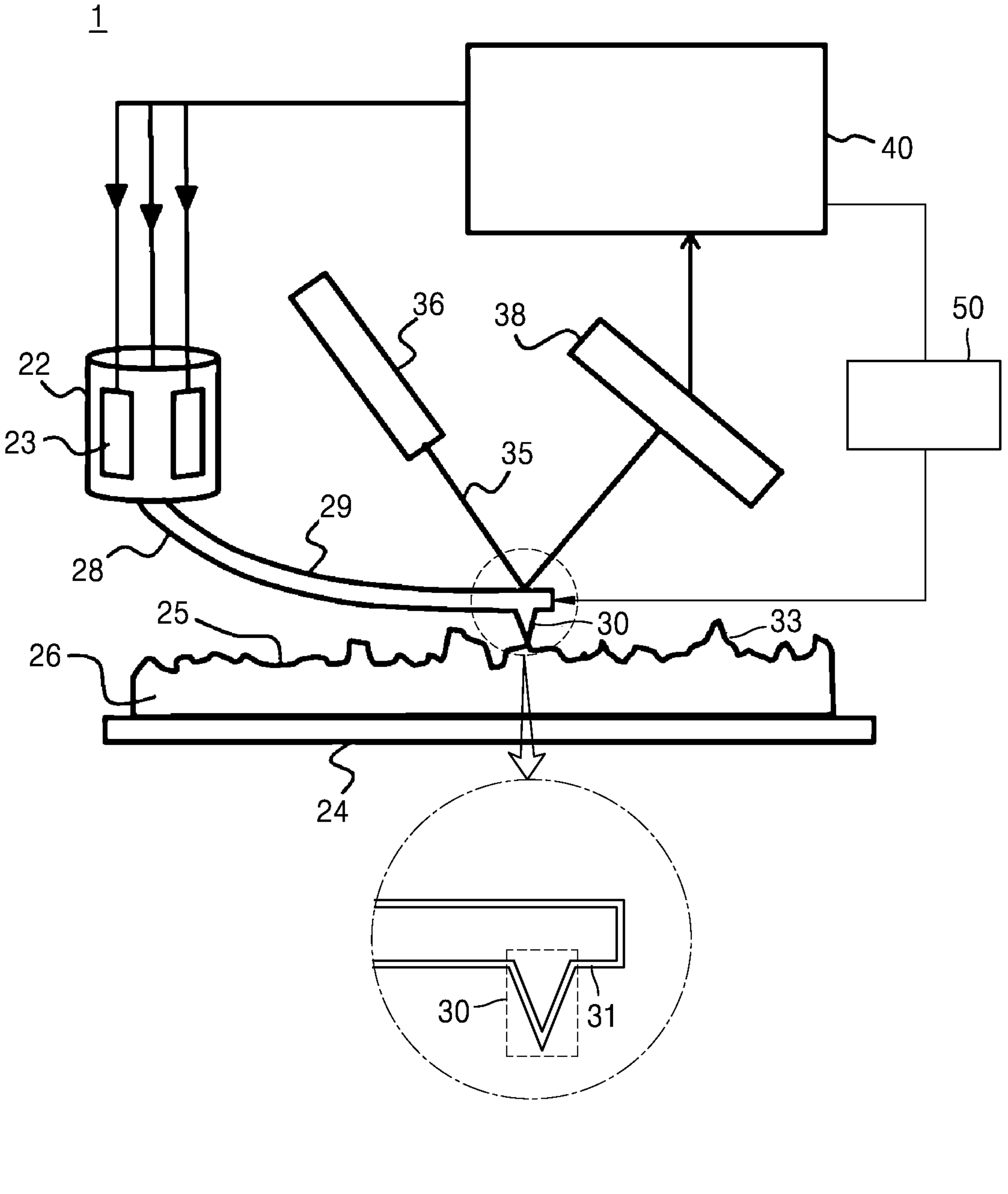
FIG. 1 is a block diagram showing the main components of a device for removing and collecting particles, according to an embodiment.

Hereinafter, embodiments of the inventive concept are described in detail with reference to the accompanying drawings. The same reference numerals are used for the same components in the drawings, and descriptions already given for them are omitted.

FIG. 1 is a block diagram showing the main components of a device 1 for removing and collecting particles, according to an embodiment.

Referring to FIG. 1, the device 1 for removing and collecting particles may include an atomic force microscope (AFM). Here, the AFM may be a microscope for detecting and mapping the surface topography of a sample surface. The device 1 for removing and collecting particles may include a probe head 22, a probe 28, a laser 36, a photodiode 38, and a feedback electronic device 40. The device 1 may further include a voltage supplier 50 to supply a positive voltage or a negative voltage according to control of the feedback electronic device 40.

The probe head 22 includes a piezo-type actuator 23 for movement of the probe 28 in the X, Y, and Z directions. The probe 28 consists of a cantilever 29 having a probe tip 30 arranged to scan the sample surface 25 of the photomask 26. During scanning, a ditherpiezo (not shown) or other means of actuation, such as photothermal actuation, electrostatics, drives the cantilever 29 in an oscillating mode (e.g., close to its resonant frequency) to enable tapping of the probe tip 30 on the sample surface 25 of the photomask 26. Methods of applying oscillatory motion to the probe tip 30 are known to those skilled in the art. Alternatively, many other modes of operating the AFM may be used. For example, the AFM may be operated in a contact mode where no tapping is performed and the probe remains in constant contact with the sample surface 25 of the photomask 26 during scanning. The term “contact,” as used herein, refers to a direct connection (i.e., touching) unless the context indicates otherwise.

Scanning of the sample surface 25 may be performed by moving the probe tip 30 in the X and Y directions parallel to the sample surface 25. The present inventive concept is not limited thereto. In some embodiments, scanning of the sample surface 25 may be performed by moving the substrate surface in the X and Y directions while holding the position of the probe tip 30 fixed in the X and Y directions. The probe tip 30 may be brought close to the sample surface 25 by a z-direction piezo actuator. Once in place, when the AFM is operated in a tapping mode, the probe tip 30 may vibrate in the z-direction to repeatedly contact the sample surface 25 during scanning (e.g., tapping). In example embodiments, the probe tip 30 may include a conductive layer 31. The conductive layer 31 may be coated along the surface of the probe tip 30. In addition, the conductive layer 31 may be formed on the surface of the probe tip 30. In some embodiments, the voltage supplier 40 may supply a positive voltage or a negative voltage to the conductive layer 31 according to a moving direction of the probe tip 30.

In a contact mode, continuous contact between the probe tip 30 and the sample surface 25 may be established and maintained. In addition, in a non-contact mode, the probe tip 30 is brought close to the sample surface 25 by the z-direction piezo actuator, and the probe tip 30 may vibrate without contacting the sample surface 25. However, during vibration, the probe tip 30 may approach the sample surface 25 close enough to experience force interaction with the sample surface 25 due to, for example, van der Waals forces. However, it is not limited thereto, and there may be other modes of operation of the AFM to perform various types of surface measurements.

The sample surface 25 may be transported using a sample carrier 24. At the same time, the laser 36 may illuminate the probe tip 30 with a laser beam 35. The exact position in the z direction may be determined using the photodiode 38 receiving the reflected laser beam 35. Deflection of the probe tip 30 caused by height differences due to structures (e.g., element 33) on the sample surface 25 (e.g., by analyzing the signal from the photodiode 38) may be measured directly or indirectly through a feedback mechanism.

The feedback electronic device 40 (i.e., a controller circuit) may receive data from the photodiode 38. In the feedback mechanism, the signal from the photodiode 38 may be kept constant by adjusting the height of the probe tip 30 above the sample surface 25. This may be achieved, for example, by driving the piezo-type actuator 23 located on the probe head 22 depending on the sensor signal from the photodiode 38, using the feedback electronic device 40. Feedback electronic device 40 may record the height adjustment to determine the sample surface topography. Or in more detail, the height adjustment may be accurately measured using an additional z-level sensor (not shown). This principle allows very accurate mapping of surface elements such as elements 33 on the sample surface 25 of the photomask 26. The feedback electronic device may include one or more of the following components: at least one central processing unit (CPU) configured to execute computer program instructions to perform various processes and methods, random access memory (RAM) and read only memory (ROM) configured to access and store data and information and computer program instructions, input/output (I/O) devices configured to provide input and/or output to the processing controller 1020 (e.g., keyboard, mouse, display, speakers, printers, modems, network cards, etc.), and storage media or other suitable type of memory (e.g., such as, for example, RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives, any type of tangible and non-transitory storage medium) where data and/or instructions can be stored. In addition, the controller can include antennas, network interfaces that provide wireless and/or wire line digital and/or analog interface to one or more networks over one or more network connections (not shown), a power source that provides an appropriate alternating current (AC) or direct current (DC) to power one or more components of the controller, and a bus that allows communication among the various disclosed components of the controller.

Atomic force microscopy using the techniques described above may enable matching of very small structures and features on surfaces, such as nanostructures with typical nanometer dimensions (e.g., dimensions even less than 1 nm, such as individual polymer strings as thin as 0.4 nm).

Figure 2:
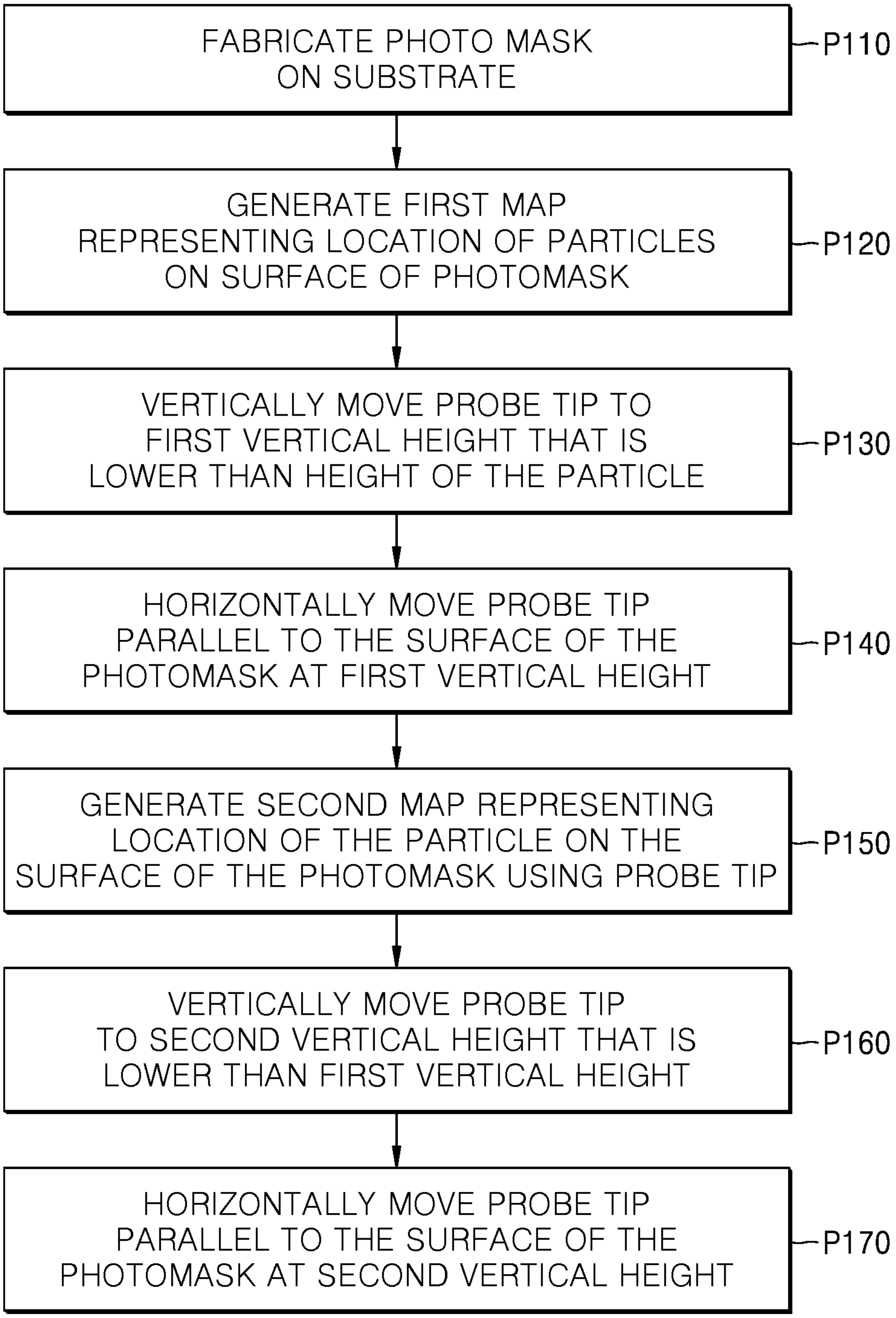
FIG. 2 is a flowchart illustrating a method of removing and collecting particles, according to an embodiment.
Figure 3:
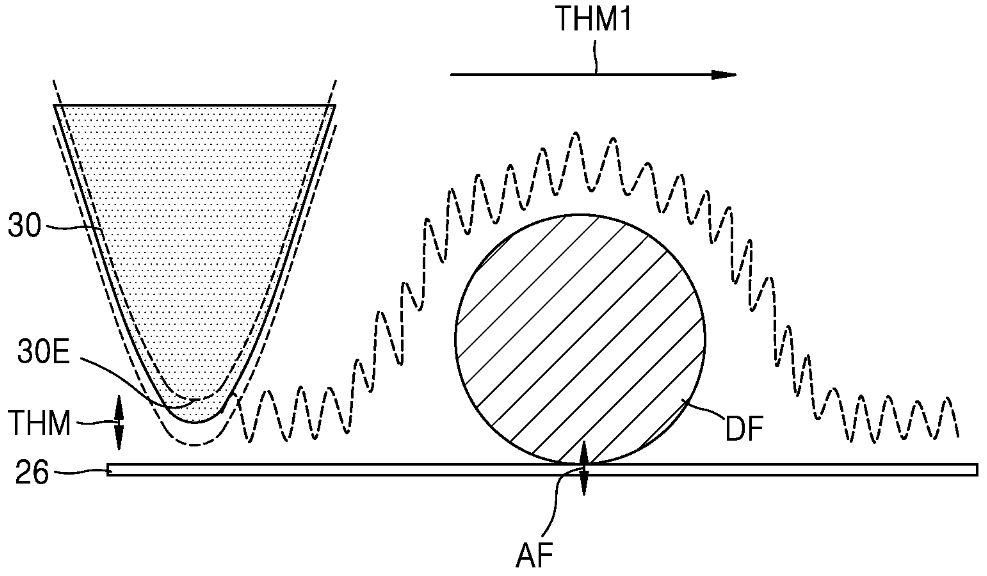
FIGS. 3 and 4 are diagrams illustrating an operating principle for detecting a surface topography of a device for removing and collecting particles, according to an embodiment.
Figure 4:
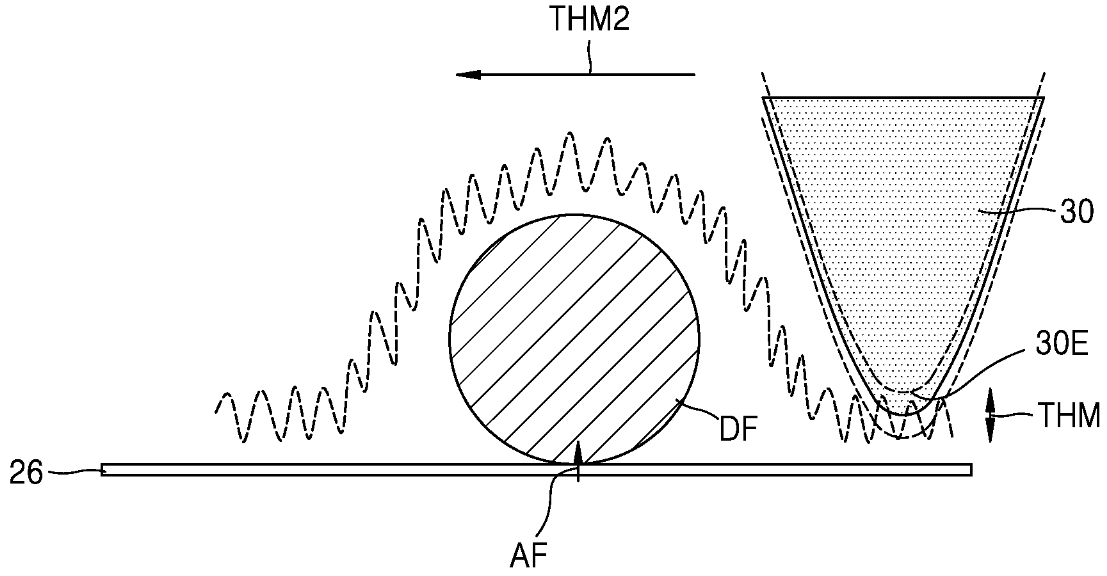

FIG. 2 is a flowchart illustrating a method of removing and collecting particles, according to an embodiment. FIGS. 3 and 4 are diagrams illustrating an operating principle for detecting a surface topography of a device for removing and collecting particles, according to an embodiment.

Referring to FIG. 2, in process P110, in a method of removing and collecting particles according to this embodiment, a photomask may be fabricated on a substrate first. Here, the photomask fabricated on the substrate may be an extreme ultra violet (EUV) photomask. According to some embodiments, the photomask may include a plurality of silicon layers and molybdenum layers alternately disposed on the silicon wafer. The photomask may further include a ruthenium (Ru)-containing layer disposed on the alternately stacked silicon-molybdenum layers. A layout pattern including a tantalum boron nitride (TaBN)-containing layer and a lawrencium-containing layer may be formed on the ruthenium-containing layer. The various materials and layers disclosed herein for the for EUV photomask are for illustrative purposes only and do not limit the technical scope of the inventive concept in any sense.

In process P120, after fabricating the photomask, a first map representing the location of particles on the surface of the photomask may be generated. Here, the first map may include surface information (e.g., heights of particles or a surface height profile) of the photomask and location information of particles. In addition, the first map may correspond to the surface topography map of FIG. 1. Based on the first map, the location of the particle on the photomask may be found. In some embodiments, in process P120, the particles may be identified from the surface of the photomask, and then for each of the identified particles, its location and a height may be stored in the first map. In some embodiments, when a height of a specific location from the surface of the photomask is greater than a threshold value, the specific location may be identified as where a particle exists. In some embodiments, when a surface profile around a specific location has an increasing height and then a decreasing height, the specific location may be identified as where a particle exists.

Referring to FIGS. 3 and 4, the probe tip 30 may move on the photomask 26. In detail, the probe tip 30 may vibrate in a vertical direction THM on the sample. In particular, the probe tip 30 may move in a first direction THM1 while not contacting the photomask 26 and the particle DF (e.g., scanning in a non-contact mode). The probe tip 30 may be close to the surface of the photomask 26 and the particle DF. In particular, the probe tip 30 may move close enough to the photomask 26 and the particle DF to experience interaction of forces due to the van der Waals force with the photomask 26 and the particle DF.

The probe tip 30 may move a predetermined distance in the first direction THM1 passing by the particle DF, and then move in a second direction THM2 opposite to the first direction. At this time, the probe tip 30 may move closer to the surface of the particle DF again.

In this way, in process P120, the probe tip 30 may generate the first map through scanning in the non-contact mode.

Referring to FIG. 2, in process P130, after generating the first map, the probe tip 30 may be vertically moved to a first vertical height TIPL1 that is lower than a height of the particle DF. Here, the height of the particle DF may mean a vertical height of the particle DF. The height of the particle DF may be provided through the first map. In detail, the height of the particle DF may mean a height from a portion where the photomask 26 and the particle DF come into contact with each other to the uppermost surface of the particle DF. In addition, vertical movement may mean movement in a vertical direction with respect to the photomask 26.

Next, in process P140, after the vertical movement, the probe tip 30 may be horizontally moved parallel to the surface of the photomask at the first vertical height TIPL1. In process P150, after horizontal movement, a second map representing the location of the particle DF on the surface of the photomask may be generated using the probe tip 30. This may be performed in the same non-contact mode scanning method as the process P120 of generating the first map. In process P160, after generating the second map, the probe tip 30 may be vertically moved to a second vertical height that is lower than the first vertical height TIPL1. In process P170, after the vertical movement, the probe tip 30 may be horizontally moved parallel to the surface of the photomask at the second vertical height. Here, in processes P140 and P160, the probe tip 30 may not vibrate.

Processes P130 to P170 are described in detail with reference to FIGS. 6 to 12 below.

Figure 5:
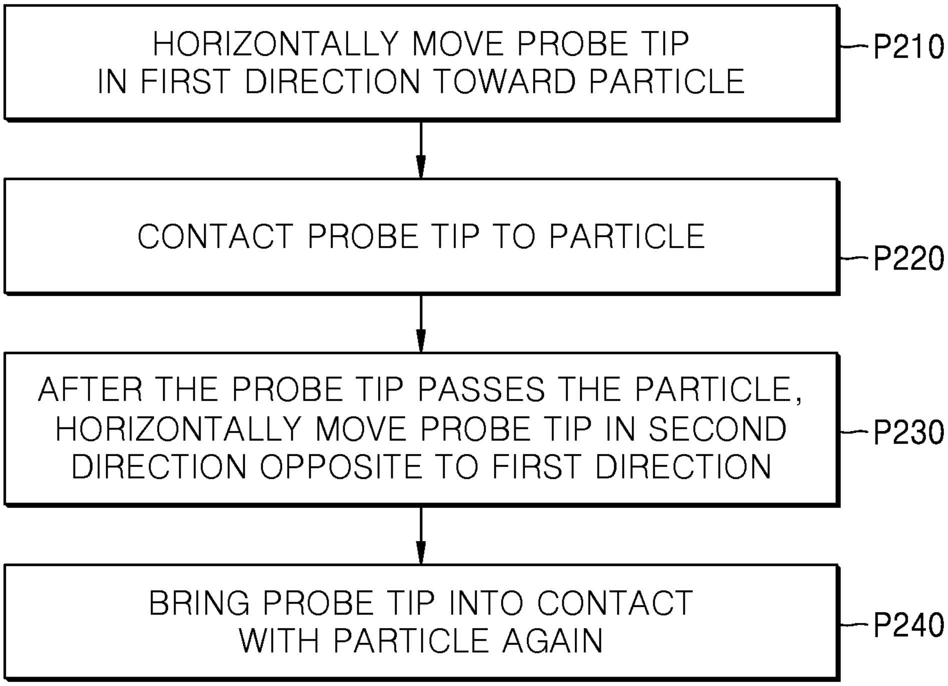
FIG. 5 is a flowchart illustrating a method of removing and collecting particles, according to an embodiment.

FIG. 5 is a flowchart illustrating a method of removing and collecting particles, according to an embodiment. FIGS. 6 to 12 are diagrams illustrating a method of removing and collecting particles, according to an embodiment. In the following, a description is made with reference to FIG. 2, and descriptions already given in the description of FIG. 2 are briefly given or omitted.

Figure 6:
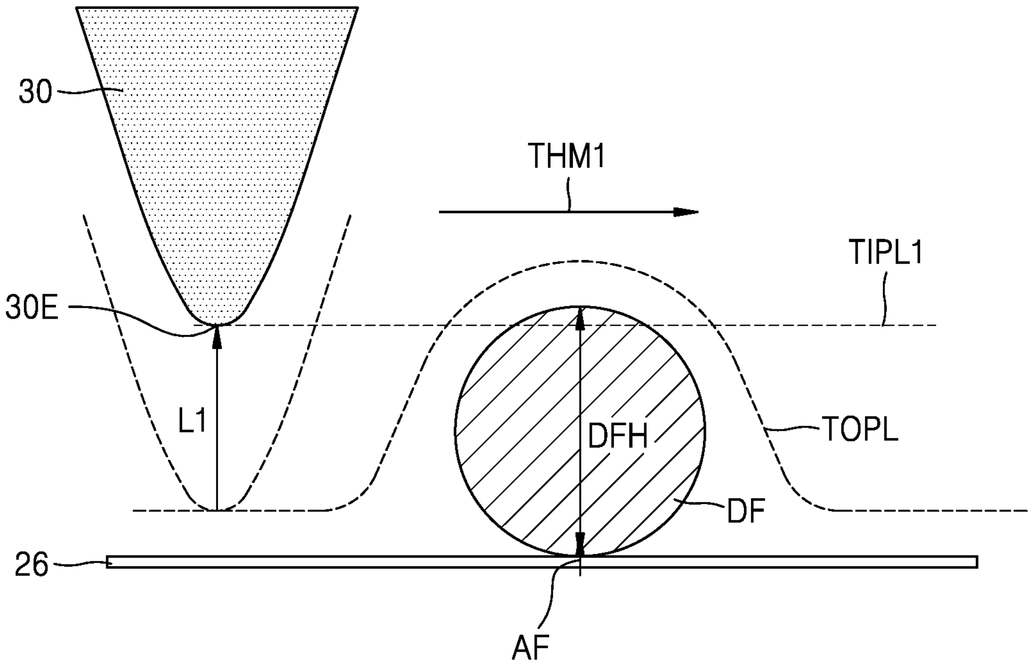
FIGS. 6 to 12 are diagrams illustrating a method of removing and collecting particles, according to an embodiment.

Referring to FIGS. 2 and 6, in process P130, after generating the first map, the probe tip 30 may be vertically moved by L1 to a first vertical height TIPL1 that is lower than the height DFH of the particle DF. By vertically moving the probe tip 30 to the first vertical height TIPL1 by L1, the particle DF may then collide with and/or contact the probe tip 30.

Referring to FIGS. 2 and 5, in process P140, after the vertical movement, the probe tip 30 may be horizontally moved parallel to the surface of the photomask 26 at the first vertical height TIPL1.

According to embodiments, a first voltage may be applied to the probe tip 30. In example embodiments, the first voltage applied to the probe tip 30 may be a positive bias voltage. In example embodiments, the first voltage may be in a range of about −20V to about +20V. However, it is not limited thereto.

The process P140 of horizontally moving the probe tip 30 may include horizontally moving the probe tip 30 in a first direction toward the particle DF (P210), contacting the particle DF with the probe tip 30 (P220), after the probe tip 30 passes the particle DF, horizontally moving the probe tip 30 in a second direction THM2 opposite to the first direction THM1 (P230), and bringing the probe tip 30 into contact with the particle DF again (P240).

Figure 7:
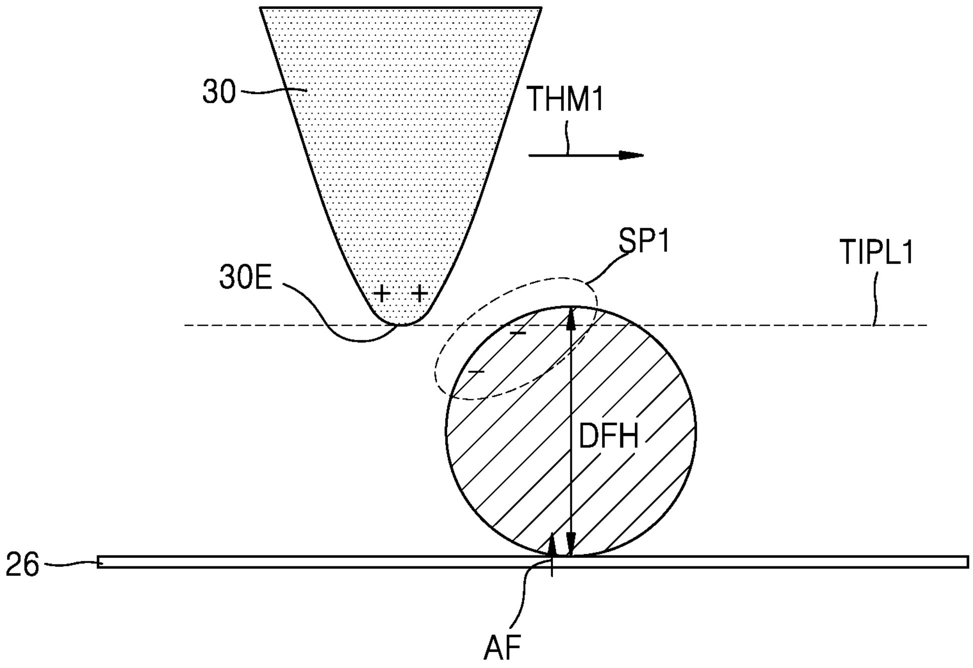

Referring to FIGS. 5 and 7, in process P210 of horizontally moving the probe tip 30 in the first direction toward the particle DF, the probe tip 30 may approach the particle DF.

In this case, it is assumed that a voltage of +1V is applied to the probe tip 30. Positive charges are applied to a distal end 30E of the probe tip 30, and as the probe tip 30 moves close to the particle DF, negative charges are induced in the first region SP1 of the particle DF. Here, negative charges of the particle DF may be induced by an electrostatic induction phenomenon. In addition, the particle DF may be metal. In example embodiments, as negative charges are induced in the first region SP1 of the particle DF, the positively charged probe tip 30 may attract the particle DF before coming into contact with the particle DF.

Figure 8:
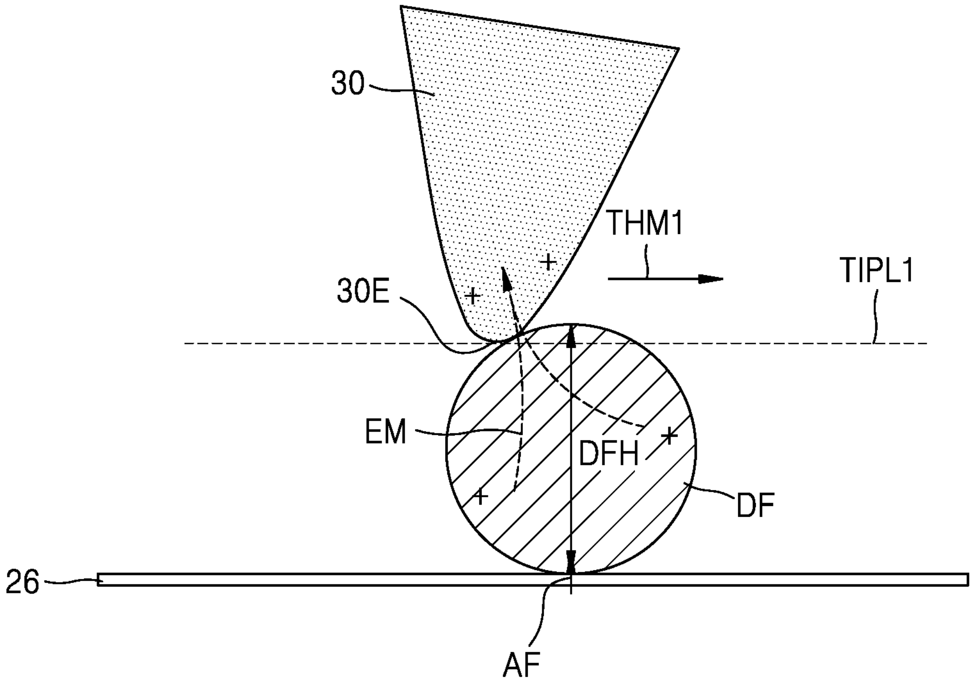

Referring to FIGS. 5 and 8, thereafter, in process P220, the probe tip 30 may be brought into contact with the particle DF.

Because the probe tip 30 moves horizontally in the first direction THM1 at the first vertical height TPL1, the probe tip 30 may contact the particle DF. Negative charges in the particle DF may move to the probe tip 30 as indicated by EM through a contact portion between the particle DF and the probe tip 30. Through this, the probe tip 30 may have a positive charge. In addition, because the probe tip 30 continuously moves in the first direction THM1, the particle DF may be pushed in the first direction THM1 in proportion to the width of a region where the probe tip 30 and the particle DF contact each other.

Figure 9:
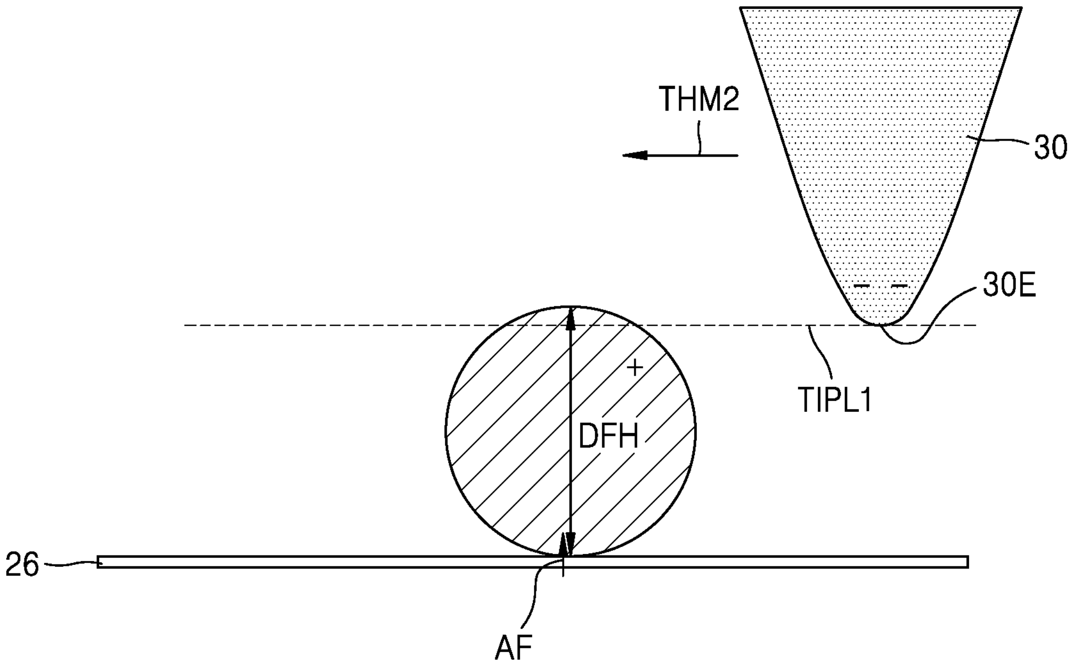

Referring to FIGS. 5 and 9, in process P230, after the probe tip 30 passes the particle DF, the probe tip 30 may be horizontally moved in a second direction THM2 opposite to the first direction THM1.

In this case, a first voltage may be applied to the probe tip 30. In example embodiments, the first voltage may be a negative bias voltage. That is, a voltage having a polarity opposite to a polarity of the voltage applied in process P210 may be used.

Figure 10:
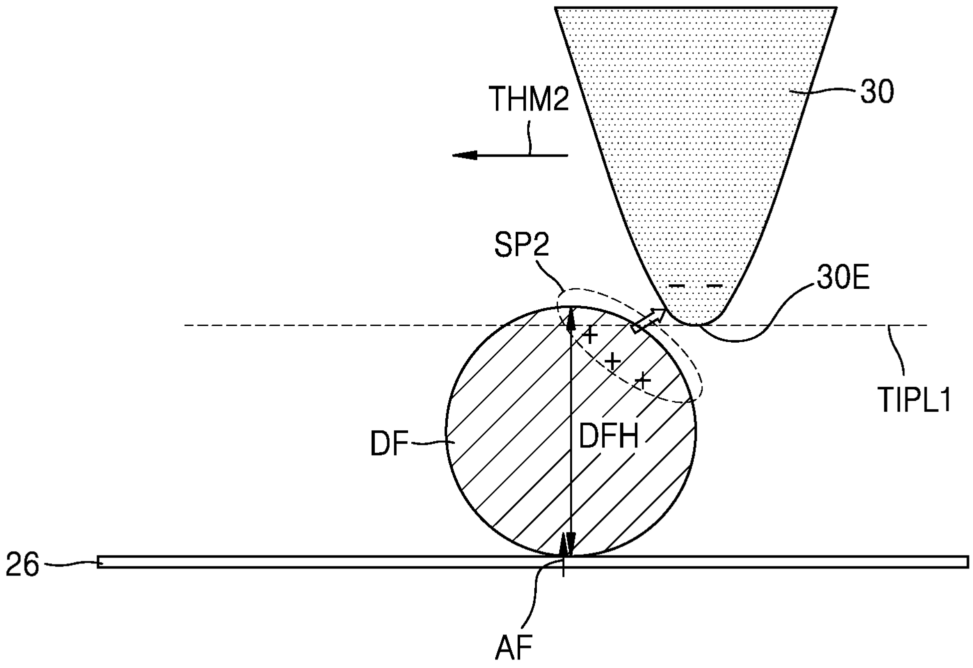

Referring to FIGS. 5 and 10, the probe tip 30 may move in the second direction THM2 and approach the particle DF.

In this case, it is assumed that a voltage of −1V is applied to the probe tip 30. Negative charges are applied to the distal end 30E of the probe tip 30, and as the probe tip 30 moves closer to the particle DF, positive charges are induced in the second region SP2 of the particle DF.

Here, positive charges of the particle DF may be distributed in the second region SP2 by an electrostatic induction phenomenon. In example embodiments, as positive charges are induced in the second region SP2 of the particle DF, the negatively charged probe tip 30 may attract the particle DF before coming into contact with the particle DF.

Figure 11:
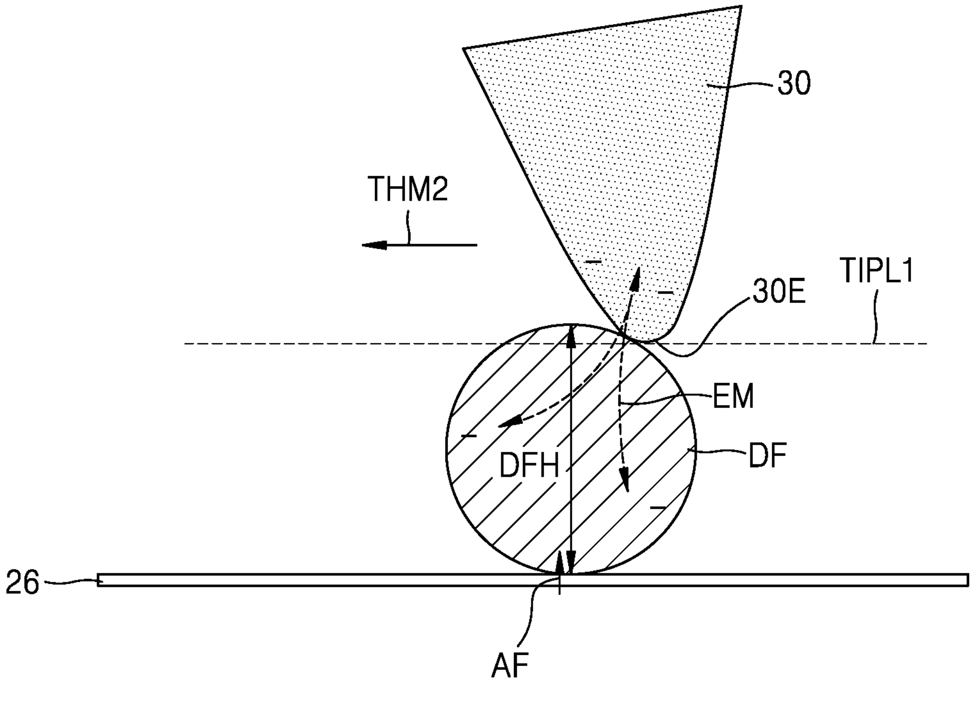

Referring to FIGS. 5 and 11, in process P240, the probe tip 30 may be brought into contact with the particle DF again.

Because the probe tip 30 horizontally moves in the second direction THM2 at the first vertical height TPL1, the probe tip 30 may contact the particle DF. Through a contact portion between the particle DF and the probe tip 30, positive charges in the particle DF may move to the probe tip 30 as indicated by EM. In addition, because the probe tip 30 continuously moves in the second direction THM2, the particle DF may be pushed in the second direction THM2 in proportion to the width of a region where the probe tip 30 and the particle DF contact each other.

Thereafter, in process P150, after the probe tip 30 returns to the vertically moved position, a second map indicating the location of the particles on the surface of the photomask may be generated using the probe tip 30. Because the method of generating the second map is the same as that of the first map, it is omitted. Here, by generating the second map, the moving position of the particle DF may be determined by comparing the second map with the first map. In addition, bonding force of the particle DF may be determined based on the moving position of the particle DF. In detail, the movement distance and movement position of the particle DF may be determined by comparing the location of the particle DF determined on the first map with the location of the particle DF determined on the second map. As the difference between the position of the particle DF on the second map and the position of the particle DF on the first map increases, it may be determined that the bonding force of the particle DF to the photomask 26 is weaker. In some embodiments, the difference between the position of the particle DF on the second map and the position of the particle DF on the first map may represent a relative strength of the bonding force applied between the particle DF and the photomask 26.

Figure 12:
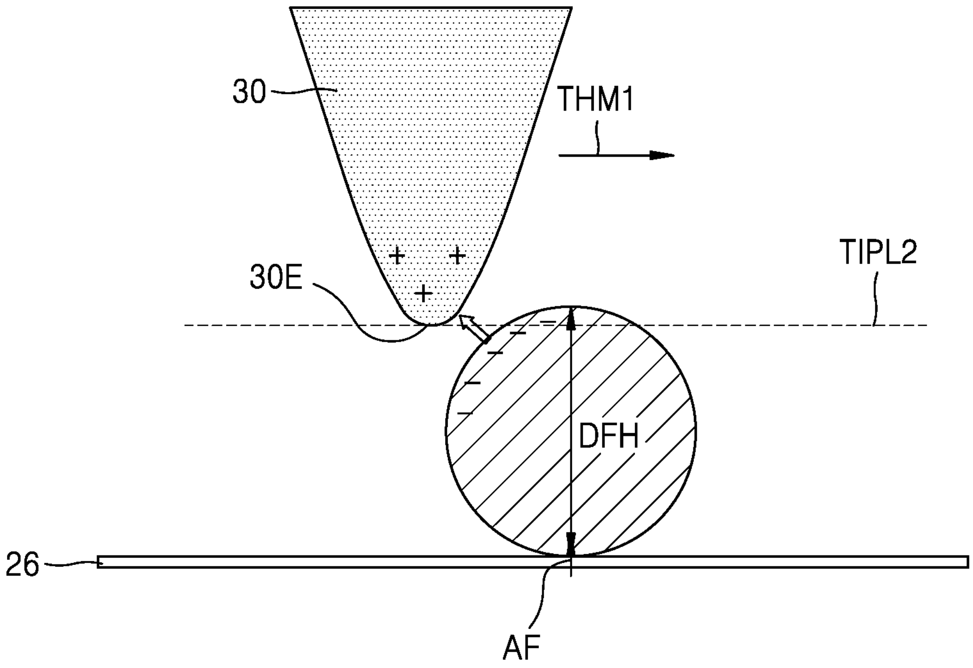

Referring to FIGS. 2 and 12, thereafter, in process P160, the probe tip 30 may be vertically moved to a second vertical height TIPL2 that is lower than the first vertical height TIPL1. Next, the probe tip 30 may be horizontally moved parallel to the surface of the photomask 26 at the second vertical height TIPL2. Processes to be performed thereafter are the same as processes P140 to P150, and the differences as described above are mainly described. Because the probe tip 30 vertically moves to the second vertical height TIPL2 that is lower than the first vertical height TIPL1, when the probe tip 30 and the particle DF come into contact thereafter, a larger area may be contacted. Accordingly, the probe tip 30 may more forcefully push the particle DF in the first direction THM1 or the second direction THM2 in FIG. 11. In some embodiments, the first vertical height TIPL1 and the second vertical height TIPL2 may be equal to or greater than half of the height of the particle DF.

In example embodiments, a higher voltage may be applied to the probe tip 30 at the second vertical height TIPL2 than that of the probe tip 30 at the first vertical height TIPL1. A second voltage that is higher than the first voltage may be applied to the probe tip 30 at the second vertical height TIPL2. In some embodiments, an absolute value of the second voltage may be higher than an absolute voltage of the first voltage. Accordingly, when the probe tip 30 to which the second voltage is applied contacts or re-contacts the particle DF, the particle DF may be attracted with a greater electrostatic force.

In this way, by repeatedly performing processes P110 to P170 of FIG. 2, the bonding force of the particle DF to the photomask 26 may be gradually weakened. In some embodiments, the particle DF may be attached to the photomask 26 by an electrostatic force applied therebetween, and thus removal of charges of the particle DF may remove such an electrostatic force between the particle DF and the photomask 26, thereby facilitation the removal of the particle DF by the probe tip 30. In some embodiments, either a negative voltage or a positive voltage may be applied to remove the particle DF charged positively or negatively. In addition, a higher voltage is applied to the probe tip 30 to apply a higher electrostatic force to the particle DF, and when the electrostatic force becomes greater than the bonding force of the particle DF, the particle DF may be removed. In addition, the particle DF may be attached and/or coupled to the probe tip 30. Through this, in the inventive concept, components of the particles DF may be analyzed by not only removing the particles DF from the photomask 26 but also collecting the particles DF through the probe tip 30. In addition, the inventive concept may prevent the generation of particles by identifying the components of the particles DF.

While the inventive concept has been particularly shown and described with reference to embodiments thereof, it will be understood that various changes in form and details may be made therein without departing from the spirit and scope of the following claims.

What is claimed is:

1. A method of removing and collecting a plurality of particles from a photomask, the method comprising:

fabricating the photomask on a substrate;

generating a first map indicating first locations of the plurality of particles on a surface of the photomask by inspecting the surface of the photomask using a probe tip;

vertically moving the probe tip to a first vertical height that is lower than a height of a first particle among the plurality of particles;

horizontally moving the probe tip parallel to the surface of the photomask at the first vertical height;

generating, after horizontally moving the probe tip at the first vertical height, a second map indicating second locations of the plurality of particles on the surface of the photomask using the probe tip;

vertically moving the probe tip to a second vertical height that is lower than the first vertical height; and horizontally moving the probe tip parallel to the surface of the photomask at the second vertical height.

2. The method of claim 1, wherein each of the generating of the first map and the generating of the second map includes: vibrating the probe tip in a vertical direction with respect to the photomask during a time when the probe tip moves along the surface of the photomask.

3. The method of claim 1, wherein each of the horizontal moving of the probe tip at the first vertical height and the horizontal moving of the probe tip at the second vertical height includes: contacting the probe tip with the first particle.

4. The method of claim 1, wherein the horizontal moving of the probe tip at the first vertical height includes: applying a first voltage to the probe tip.

5. The method of claim 4, wherein the horizontal moving of the probe tip at the second vertical height further includes: applying a second voltage that is higher than the first voltage to the probe tip.

6. The method of claim 1, wherein each of the horizontal moving of the probe tip at the first vertical height and the horizontal moving of the probe tip at the second vertical height includes: horizontally moving the probe tip in a first direction toward the first particle; contacting the probe tip with the first particle; horizontally moving the probe tip in a second direction opposite to the first direction after moving the probe tip past the first particle; and contacting the probe tip with the first particle again.

7. The method of claim 6, wherein one of a negative voltage and a positive voltage is applied to the probe tip during a time when the probe tip moves horizontally in the first direction, and wherein the other of the negative voltage and the positive voltage is applied to the probe tip during a time when the probe tip moves horizontally in the second direction.

8. The method of claim 6, wherein each of the horizontal moving of the probe tip toward the first particle in the first direction and the horizontal moving of the probe tip toward the first particle in the second direction opposite to the first direction includes: inducing a charge with a polarity opposite a polarity of a voltage of the probe tip to the surface of the first particle.

9. The method of claim 1, further comprising: determining a moving position of the first particle by comparing the second map with the first map; and determining a bonding force of the first particle based on the moving position of the first particle.

10. The method of claim 1, wherein the horizontal moving of the probe tip at the first vertical height includes: maintaining a vertical height of the probe tip at the first vertical height without vibration during a time when the probe tip moves horizontally at the first vertical height, and wherein the horizontal moving of the probe tip at the second vertical height includes: maintaining a vertical height of the probe tip at the second vertical height without vibration during a time when the probe tip moves horizontally at the second vertical height.

11. A method of removing and collecting a plurality of particles from a photomask, the method comprising: fabricating the photomask on a substrate; generating a first map indicating locations of the plurality of particles on a surface of the photomask by inspecting the surface of the photomask using a probe tip; applying a first voltage to the probe tip and vertically moving the probe tip to a first vertical height that is lower than a height of a first particle among the plurality of particles based on the first map; horizontally moving the probe tip parallel to the surface of the photomask at the first vertical height; generating a second map indicating locations of the plurality of particles on the surface of the photomask using the probe tip; applying a second voltage that is higher than the first voltage to the probe tip and vertically moving the probe tip to a second vertical height that is lower than the first vertical height; and horizontally moving the probe tip parallel to the surface of the photomask at the second vertical height, wherein each of the horizontal moving of the probe tip at the first vertical height and the horizontal moving of the probe tip at the second vertical height includes: horizontally moving the probe tip in a first direction toward the first particle; contacting the probe tip with the first particle; horizontally moving the probe tip in a second direction opposite to the first direction after moving the probe tip past the first particle; and contacting the probe tip with the first particle again.

12. The method of claim 11, wherein the probe tip includes a conductive layer formed on a surface of the probe tip.

13. The method of claim 11, wherein, when the probe tip contacts or re-contacts the first particle, one of positive charges and negative charges move from the first particle to the probe tip.

14. The method of claim 11, wherein, in the generating of the first map and the second map, the probe tip moves along the surface of the photomask while vibrating in a direction perpendicular to the photomask, and wherein in horizontally moving the probe tip at the first vertical height and horizontally moving the probe tip at the second vertical height, the probe tip moves without vibration.

15. The method of claim 11, wherein the first vertical height and the second vertical height are equal to or greater than half of the height of the first particle.

16. The method of claim 12, wherein, when the probe tip moves in the first direction, one of a negative voltage and a positive voltage is applied to the conductive layer, and wherein, when the probe tip moves in the second direction, the other voltage of the negative voltage and the positive voltage is applied to the conductive layer.

17. The method of claim 11, wherein the probe tip moves the first particle by applying an electrostatic force to the first particle when contacting or re-contacting the first particle.

* * * * *